(12) United States Patent
Skeen et al.

(10) Patent No.: US 7,459,199 B2
(45) Date of Patent: Dec. 2, 2008

(54) METHOD OF AND APPARATUS FOR STRENGTHENING EDGES OF ONE OR MORE GLASS SHEETS

(75) Inventors: W. Jason Skeen, Export, PA (US);
Dennis H. Alcorn, Verona, PA (US);
Robert G. Frank, Sarver, PA (US);
Steven M. Horcicak, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 633 days.

(21) Appl. No.: 10/767,915

(22) Filed: Jan. 29, 2004

(65) Prior Publication Data

US 2005/0166639 A1    Aug. 4, 2005

(51) Int. Cl.
*B32B 17/06* (2006.01)
*C03C 3/00* (2006.01)

(52) U.S. Cl. .................. 428/192; 428/426; 428/446; 501/11

(58) Field of Classification Search ........................ None
See application file for complete search history.

(56) References Cited

U.S. PATENT DOCUMENTS

| | | | |
|---|---|---|---|
| 3,976,462 A | 8/1976 | Sutara | 65/107 |
| 4,075,381 A * | 2/1978 | Furukawa et al. | 428/192 |
| 4,375,978 A | 3/1983 | Reese et al. | 65/287 |
| 4,687,501 A | 8/1987 | Reese | 65/103 |
| 4,749,399 A | 6/1988 | Yamada et al. | 65/273 |
| 4,871,385 A | 10/1989 | Lecourt et al. | 65/115 |
| 4,894,080 A | 1/1990 | Reese et al. | 65/106 |
| 4,979,977 A | 12/1990 | Frank et al. | 65/107 |
| 5,049,178 A | 9/1991 | Pereman et al. | 65/106 |
| 5,679,124 A | 10/1997 | Schnabel, Jr. et al. | 65/348 |
| 5,938,810 A | 8/1999 | DeVries, Jr. et al. | 65/268 |
| 6,004,655 A * | 12/1999 | Tanaka et al. | 428/192 |
| 6,015,619 A | 1/2000 | Schnabel, Jr. et al. | 428/410 |
| 6,582,799 B1 * | 6/2003 | Brown et al. | 428/174 |

FOREIGN PATENT DOCUMENTS

| | | |
|---|---|---|
| CA | 736880 | 6/1966 |
| DE | 10257972 B3 | 6/2004 |
| EP | 0400631 A | 12/1990 |
| JP | 06 219759 | 8/1994 |

* cited by examiner

*Primary Examiner*—Ling Xu
(74) *Attorney, Agent, or Firm*—Andrew C. Siminerio (57) ABSTRACT

A furnace includes a section defined as a heating section capable of attaining a predetermined temperature, the heating section having an entrance end and an exit end; a section defined as a cooling section capable of having a temperature gradient from entrance end of the cooling section to exit end of the cooling section, the entrance end of the cooling section mounted in a fixed relationship to the exit end of the heating section; a section defined as an edge cooling section between the exit end of the heating section and the entrance end of the cooling section; and an edge cooling device positioned in the edge cooling section relative to a predetermined area, and capable of cooling at least selected peripheral portions of the predetermined area at a faster rate than center portions of the predetermined area.

19 Claims, 6 Drawing Sheets

METHOD OF AND APPARATUS FOR STRENGTHENING EDGES OF ONE OR MORE GLASS SHEETS

BACKGROUND OF THE INVENTION

1. Field of the Invention

This invention relates to a method of and an apparatus for cooling edge portions, e.g. peripheral and marginal edge portions, of one or more sheets, e.g. one or more glass sheets, to strengthen the edge portions of the sheets, and in particular, to method of and apparatus for extracting heat at a faster rate from edge portions of heated glass sheets supported on a bending iron than the central portions of the sheets to rapidly cool and strengthen the edge portions of the sheets.

2. Discussion of Technical Background

The method of laminating glass windows for vehicles, e.g. automotive windshields, usually includes the steps of forming the glass sheets, e.g. by placing a pair of glass sheets onto a mold commonly referred to as one of the following: a bending iron, a bending mold, a shaping mold and an outline mold, and moving the outline mold and glass sheets supported thereon through a heating furnace for gradual heating and gravity sagging of the pair of glass sheets to provide glass sheets having a desired shape. After the sheets are shaped, the sheets are slowly cooled during an annealing cycle to remove most of the stress from the glass sheets. Edge compression for such glass sheets is normally about 1500 to 2500 pounds per square inch ("psi") (10.3 to $17.3 \times 10^6$ Pascals ("Pa")). After the shaping and annealing operations, a sheet of polyvinyl butyral is placed between the glass sheets to provide a subassembly which is exposed to heat and pressure during a conventional laminating process to form a laminated glass window, e.g. a laminated automotive windshield.

It is generally understood that edge compression of less than about 1500 psi ($10.3 \times 10^6$ Pa) increases the probability of damaging the edges of a laminated glass window, e.g. a laminated windshield during installation into a vehicle window opening. As can be appreciated, increasing the edge compression to at least 3000 psi, e.g. 3,000-5,000 psi ($20.7$-$34.5 \times 10^6$ Pa) reduces the tendency of edge damage, e.g. during installation of the windshield.

U.S. Pat. No. ("USPN") 5,938,810 discusses press-bending sheets utilizing forced area cooling. In general, a sheet of glass is heated to a formable state and pressed between a rigid mold and pressing member. The pressing member presses the heated sheet against the rigid mold to bend and cool the sheet. U.S. Pat. No. 5,938,810 recognizes that in some applications, for instance in windshields, it is desirable to cool the edge of the glass sheet at a faster rate than the central portion of the sheet to provide an enhanced edge temper on the glass sheet. The cooling of the glass edges is accomplished by using an internal air manifold that directs air to the edge of a heated glass sheet while the sheet is between the rigid mold and the pressing member.

U.S. Pat. Nos. 4,749,399; 5,679,124 and 6,015,619 also discuss techniques of cooling marginal edge portions of glass sheets supported on cooling rings to strengthen the edges of glass sheets.

Although there are techniques to cool the edges of a glass sheet while the sheet is between pressing molds, and to cool the marginal edges of a glass sheet while on a cooling ring; there are no satisfactory techniques to cool the peripheral edges of a pair of shaped glass sheets while supported on an outline mold, e.g. but not limited to outline molds, and/or shaping techniques, of the types discussed in U.S. Pat. Nos. 3,976,462; 4,375,978; 4,687,501; 4,894,080; 4,979,977 and 5,049,178.

As can be appreciated, it would be advantageous to provide a method of and apparatus for extracting heat at a faster rate from the peripheral and marginal edge portions of heated glass sheets supported on an outline mold than the central portions of the sheets to cool and strengthen at least the peripheral edge portions of the glass sheets.

SUMMARY OF THE INVENTION

The present invention provides a furnace comprising: a section defined as a heating section capable of attaining a predetermined temperature, the heating section having an entrance end and an exit end; a section defined as a cooling section capable of having a temperature gradient from entrance end of the cooling section to exit end of the cooling section, the entrance end of the cooling section mounted in a fixed relationship to the exit end of the heating section; a section defined as an edge cooling section between the exit end of the heating section and the entrance end of the cooling section; and an edge cooling device positioned in the edge cooling section relative to a predetermined area, and capable of cooling at least selected peripheral portions of the predetermined area at a faster rate than center portions of the predetermined area. Although not required, the furnace can include a conveying arrangement to move a glass sheet through the heating section, into the predetermined area of the edge cooling section, wherein at least peripheral portions of the sheet are cooled faster than center portions of the sheet, and through the cooling section, wherein the cooling section has a temperature gradient to provide the glass sheet within one of the following categories; an annealed sheet, a tempered sheet and a heat strengthened sheet. In nonlimiting embodiments of the invention, the edge cooling device is selected from equipment for directing fluid toward the predetermined area, equipment for providing a negative pressure to the predetermined area and equipment for absorbing radiant energy from the predetermined area.

The present invention also provided a method of strengthening at least the peripheral edge portions of at least one sheet, the at least one sheet having opposite major surfaces and a peripheral edge between and interconnecting the opposite major surfaces, the method comprising: heating the at least one sheet to a temperature above strain point of the sheet; positioning a heat-extracting medium in facing relation to selected peripheral edge portions of the at least one sheet; extracting heat from at least selected peripheral edge portions of the at least one sheet while having a center portion of at least one of the major surfaces of the at least one sheet out of contact with any solid object, wherein heat is extracted from the at least selected peripheral edge portions of the at least one sheet at a rate sufficient to increase the edge strength of the at least selected peripheral edge portions and adjacent marginal edge portions of the at least one sheet and to establish a temperature differential between the peripheral edge portions of the at least one sheet and the center portion of the at least one sheet to prevent fracturing of the at least one sheet during the practice of extracting heat. In nonlimiting embodiments of the invention, the cooling step is selected from one of the following steps: annealing the shaped glass sheets, heat strengthening the shaped glass sheets and tempering the shaped glass sheets.

In another embodiment of the present invention involving a method of making a windshield by heating and shaping a pair of glass sheets while supported on an outline mold, annealing the shaped sheets placing a plastic interlayer between the shaped glass sheets, and autoclaving the shaped glass sheets having the plastic interlayer therebetween to laminate the shaped glass sheets and plastic interlayer together, the methods includes an improvement comprising: after the practice of heating and shaping, extracting heat from at least selected peripheral edge portions of the sheets while supported on the outline mold at a rate sufficient to increase edge strength of the at least selected peripheral edge portions and adjacent marginal edge portions of the sheets and to establish a temperature differential between the at least selected peripheral edge portions of the sheets and center portions of the sheets to prevent fracturing of one or both of the sheets during the practice of extracting heat.

The present invention further provides a glass sheet having an annealed center portion and a peripheral edge, wherein portions of the glass sheet within a distance of 0.125 inch (0.32 cm) from the peripheral edge have a strength of at least 3,000 psi ($20.7 \times 10^6$ Pa). Although not required, the glass sheet is part of a transparency selected from transparencies for above water, below water, air and/or space vehicles; automotive side windows, automotive back windows, multiple glazed windows for homes, buildings and temperature controlled storage compartments having a viewing area.

DETAILED DESCRIPTION OF THE INVENTION

In the following discussion of nonlimiting embodiments of the invention, heat is extracted or removed from at least the peripheral edges of a pair of shaped glass sheets supported on an outline mold, also referred to as a bending iron, bending mold, or shaping mold, to cool the peripheral and marginal edges of the glass sheets during the end of a shaping cycle or process, and/or the start of an annealing cycle or process, at a faster rate than the central portion of the glass sheets to strengthen at least the peripheral edge portions of the sheets. The shaped glass sheets are subsequently processed, e.g. laminated in any usual manner to manufacture automotive windshields. As will be appreciated, the invention is not limited to the number of sheets that can have their edge portions cooled and strengthened at one time, e.g. but not limiting the invention thereto, the edge portions of one, two, three or more sheets can be cooled and strengthened at one time. Further, the invention is not limited to the materials of the glass sheets, e.g. but not limiting the invention thereto, the edges portions of plastic, metal, ceramics and glass-ceramics sheets can be cooled. Still further, the invention is not limited to extracting heat from the peripheral and/or marginal edge portions of shaped sheets, e.g. but not limiting the invention thereto, the invention can be practiced to extract heat from the peripheral and/or marginal edges of flat sheets. In addition, the invention is not limited to cooling and strengthening the peripheral and/or marginal edge portions of sheets prior to an annealing process, e.g. but limiting the invention thereto, the invention can be practiced on sheets prior to a tempering and/or heat strengthening process. Further, the invention is not limited to using the glass sheets in a process to make laminated automotive windshields, e.g. but not limiting the invention thereto, the glass sheets having the peripheral edge portions strengthened according to the invention can be used in a process to make a transparency or part of a transparency for land, above water, below water, air and/or space vehicle, e.g. an automotive side window and/or back window, for multiple glazed windows for homes, buildings and temperature controlled storage compartments having a viewing area. As can be appreciated, the invention is not limited to the equipment used, and/or process practiced, to heat the sheets, to shape the sheets, to cool the sheets and/or subsequently process the sheets, e.g. but not limiting to the invention, laminate a pair of shaped glass sheets to make automotive windshields.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 7.6, or 3.7 to 9.1 or 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the substrate.

Nonlimiting embodiments of the invention will be discussed with the process of making automotive windshields. It is understood that the invention is not limited in its application to the details of the particular embodiments shown and discussed since the invention is capable of other embodiments. Further, the terminology used herein is for the purpose of description and not of limitation. The process for fabricating automotive windshields for ease of discussion and for a full appreciation of the invention is considered to include a bending cycle and a laminating cycle. In the following discussion, unless indicated otherwise, like numbers refer to like elements.

Figure 1:
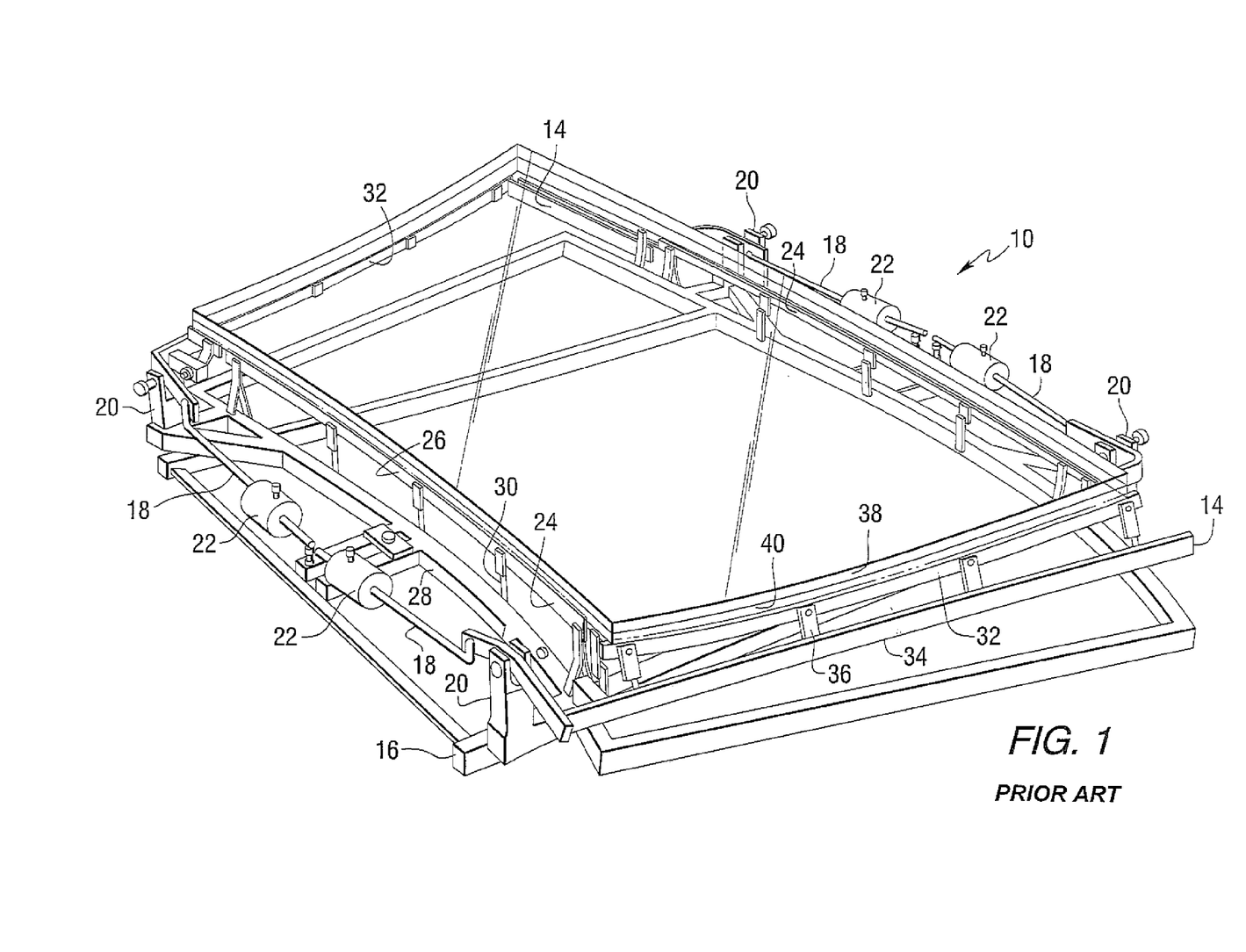
FIG. 1 is an isometric view of a nonlimiting outline mold or bending iron that can be used in the practice of the invention.

Referring to FIG. 1, there is shown an articulating glass outline mold or bending iron 10 of the type discussed in U.S. Pat. Nos. 3,976,462, 4,687,501 and 4,979,977, and Canadian Patent No. 736,880. As can be appreciated, non-articulating bending molds of the type discussed in U.S. Pat. No. 4,375,978 can also be used in the practice of the invention. FIG. 1 is similar to FIG. 1 of U.S. Pat. Nos. 4,687,501 and 4,979,977 with the exception that the heat-retaining shields discussed in U.S. Pat. No. 4,687,501, and the shaping pan member discussed in U.S. Pat. No. 4,979,977 have been removed for purposes of clarity; however, as can be appreciated, the embodiments of the invention can be practiced with the bending mold shown in FIG. 1 having the heat retaining shields discussed in U.S. Pat. No. 4,687,501 and/or the heat resistance cover discussed in U.S. Pat. No. 4,979,977. U.S. Pat. Nos. 3,976,462; 4,375,978; 4,687,501 and 4,979,977, and Canadian Patent No. 736,880 are hereby incorporated by reference.

With reference to FIG. 1, the bending mold 10 includes a central mold portion 12 flanked by two pivoting mold end sections 14. The mold 10 is supported for movement through a heating lehr of the type shown in FIG. 2 by a main frame 16. Weight arms 18 are attached to each of the mold end sections 14 and are mounted on the frame 16 by hinge posts 20. The weight arms 18 are provided with counterweights 22 at their longitudinal inward extremities, which tend to rotate the mold end sections 14 about the hinge posts 20 from an open position (not shown) to a closed position as depicted in FIG. 1. The weight arms 18 are positioned laterally outside shaping rails 24 of the outline mold 10.

The shaping rails 24 of the mold 10 include central shaping rails 26 supported from rigid reinforcing bars 28 by members 30 in the central portion 12, and end shaping rails 32 supported from reinforcing bars 34 by members 36 in each of the mold end sections 14. The reinforcing bars 28 in the central mold section 12 are rigidly attached to the frame 16 while the reinforcing bars 34 in each of the end mold sections 14 are pivotally mounted on the frame 16 through the hinge post 20. When the mold sections 14 are in their pivoted upright and closed position as shown in FIG. 1, the elevational contour of the shaping rail 24 defines the final desired contour of the shaped glass sheet slightly inboard of the glass sheet perimeter.

Bending Cycle

In a nonlimiting embodiment of the invention, the basic steps practiced in bending or shaping glass sheets using bending irons include:
(1) Cutting a pair of flat glass sheets in any usual manner to their ultimate outlines differing slightly in size from one another, e.g. the sheet designated to be the outer sheet as the windshield is mounted is slightly larger than the other sheet.
(2) Applying a parting material to the upper surface of the slightly larger sheet of the pair of glass sheets.
(3) Aligning each pair of sheets 38 and 40 in face-to-face relation so that the slightly smaller sheet 38 is above the other sheet 40 of the pair and the parting material is between the pair of glass sheets.

The invention is not limited to the furnace used to shape and anneal the glass sheets. In the following nonlimiting embodiment of the invention, the invention is practiced using a tunnel lehr of the type shown in FIG. 2.
(4A) Loading the pair of aligned sheets 38 and 40 at a mold loading station (not shown) on the bending mold 10 (see FIG. 1). The sheets 38 and 40 are usually flat when placed on the bending iron and the rigid flat sheets are supported on the outside shaping rails 24, and maintain the end shaping rails 32 in general alignment with the shaping rails 24 against the biasing force of the counterweights 22.
(5A) With reference to FIG. 2, passing a succession of the bending irons 10 having the pair of glass sheets 38 and 40 (the bending irons 10 having the flat glass sheets (hereinafter also referred to as "flat sheet-laden iron") are designated by the number 44) along the path 46 through a bending and annealing lehr 48 where the glass sheets 38 and 40 are heated to their deformation temperature as they pass through heating section 50 of the lehr 48 so that the sheets sag by gravity until the lower sheet conforms to the outline of the outline mold or bending iron 10 and the upper sheet of the pair sags to conform to the shape of the lower sheet (see FIG. 3). The end portions of the heat-softened sheets are raised upward by the end shaping rails 32 moving under the biasing force of the counterweights 22.
(6A) Soon after the glass sheets 38 and 40 attain their desired curvature, moving the bending iron 10 having the shaped glass sheets (the bending iron having the shaped sheets (hereinafter also referred to as "shaped sheet-laden iron") designated by the number 52 in FIG. 2) into edge cooling section 54 of the lehr 48 where peripheral edges 56 of the shaped sheets 38 and 40 (see FIG. 3) are cooled in accordance to the invention in a manner discussed below to cool the edges of the sheets at a faster rate than the central portion of the sheets to increase the edge strength of the glass sheets.
(7A) Moving the bending iron having the shaped sheets with the strengthened edges (the bending iron 10 having the edge strengthened shaped glass sheets (hereinafter also referred to "strengthened shaped sheet-laden iron") designated by the number 58 in FIGS. 2 and 3) out of the edge cooling section 54 through annealing section 60 of the lehr 48 to controllably cool the glass sheets from their deformation temperature through their annealing temperature range to anneal the edge strengthened shaped glass sheets. As can be appreciated, the annealing of the shaped glass sheets can be initiated when the shaped glass sheets leave the heating section 50 and move into the edge cooling section 54.
(8A) Moving the strengthened shaped sheet-laden irons 58 from the annealing section 60 of the lehr 48 to an unload station 62 where the shaped annealed glass sheets having the strengthened edges are further cooled to a temperature at which the glass sheets can be handled.
(9A) Removing the pair of shaped annealed glass sheets having the strengthened edges from the bending iron 10 and returning the bending iron to the loading station (not shown) for a repeat of steps (4A) through (9A).

In the following nonlimiting embodiment of the invention, the invention is practiced using a furnace 70 of the type shown in FIG. 4. The furnace 70 has a conveying system (not shown) to move boxes 72 through heating compartments or zones 75 to 84 along the path designated by the arrows 86. The compartments or zones 75-79 are heating compartments or zones in which the glass sheets are heated and shaped, and the compartments or zones 80-84 are cooling compartments or zones in which the shaped sheets are annealed. The box remains in each heating compartment for a period time dependent on the size of the glass sheets to be shaped, the contour of the shape to be achieved and the number of heating compartments. Usually the box remains in each heating compartment 75-79 for a period of 20-90 seconds, and the box remains in each cooling compartment 80-84 for a period of 10-30 seconds. The boxes are usually open top boxes to expose the sheets to the heating coils (not shown) mounted on the ceiling of the furnace. A company that sells this type of furnace is Cattin Furnace Co. of Holland. As can be appreciated the furnace can have any number of heating zones and cooling zones, and the number of heating and cooling zones can be the same or different.

Steps (1) through (3) are practiced.

(4B) Loading the pair of aligned sheets 38 and 40 on a bending iron fixed inside a box 72 at a loading station (not shown). As discussed above, the sheets 38 and 40 are usually flat when placed on the bending mold and the rigid flat sheets are supported on the outside shaping rails 24, and maintain the end shaping rails 32 in general alignment with the shaping rails 24 against the biasing force of the counterweights 22.

Figure 3:
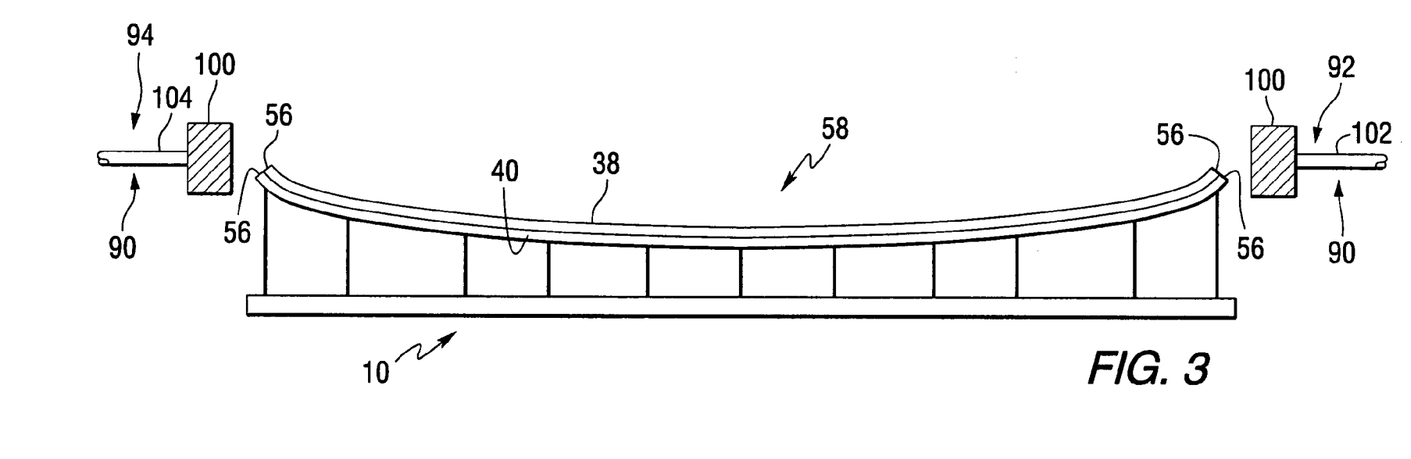
FIG. 3 is a side elevated view of a pair of shaped glass sheets on a nonlimiting embodiment of an outline mold or bending iron having equipment incorporating features of the invention to extract heat from at least the peripheral edges of the shaped sheets in accordance to the invention.
Figure 4:
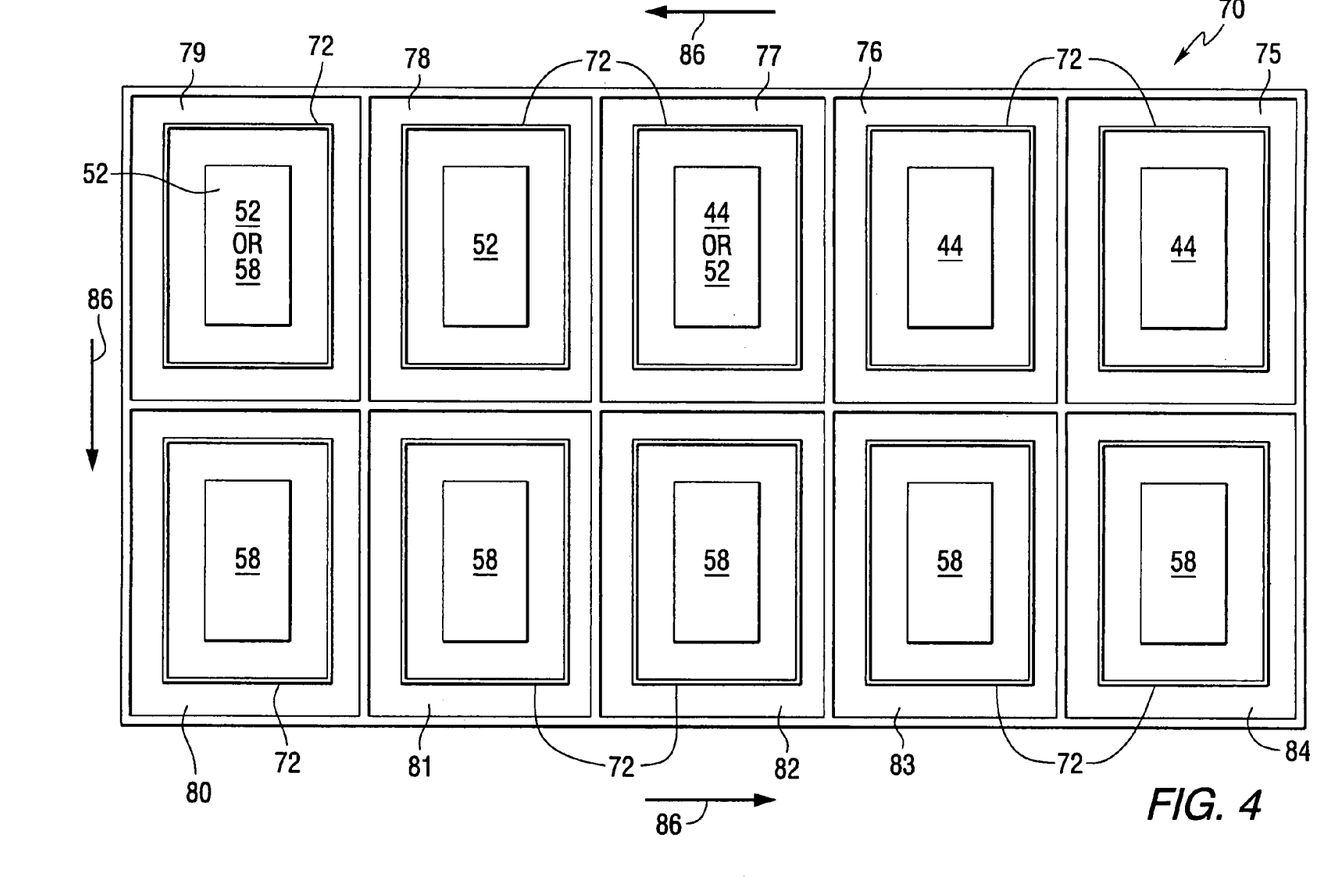
FIG. 4 is a plan view of the interior of a nonlimiting embodiment of a furnace that can be used in the practice of the invention to shape a pair of glass sheets, edge strengthen the edge portions of the sheets in accordance to the invention and anneal the edge strengthened shaped sheets.

(5B) With reference to FIG. 4, passing a succession of the boxes having flat glass-laden iron 44 along the path 86 through the compartments 75-78 and pausing for the predetermined time period in each compartment to heat the glass sheets to their deformation temperature so that the sheets sag by gravity until the lower sheet conforms to the outline bending mold 10 and the upper sheet of the pair sags to conform to the shape of the lower sheet (see FIG. 3). The end portions of the heat-softened sheets are raised upward by the end shaping rails 32 moving under the biasing force of the counterweights 22 to attain their desired curvature.

(6B) Moving the box 72 having a shaped sheet-laden iron 52 into the compartment 79, where peripheral edges 56 of the shaped sheets 38 and 40 (see FIG. 3) are cooled in accordance to the invention in a manner discussed below to cool the edges of the sheets at a faster rate than the central portion of the sheets to increase the edge strength of the glass sheets.

(7B) Moving the boxes having the strengthened shaped sheet-laden iron 58 out of the compartment 79, and through the compartments 80-84, remaining in the compartments for the predetermined time period to anneal the edge strengthened shaped glass sheets. As can be appreciated, the edge cooling of the shaped glass sheets can be performed at the end of the heating cycle, e.g. in compartment 79 or the beginning of the annealing of the shaped glass sheets, e.g. in compartment 80.

(8B) Moving the box having the strengthened shaped sheet-laden iron 58 from the compartment 84 to an unload station (not shown) where the shaped annealed glass sheets having the strengthened edges are further cooled to a temperature at which the glass sheets can be handled.

(9B) Returning the box having the bending iron to the loading station (not shown) for a repeat of steps (4B) through (9B).

The invention was practiced on soda—lime-silicate glass sheets cut from a glass ribbon made by the float process. The sheets were heated, shaped the edges of the sheets strengthened in a manner discussed below and annealed using a lehr similar to the type shown in FIG. 2, and a furnace similar to the type shown in FIG. 4.

As can be appreciated, the invention is not limited to the physical and/or chemical properties of the glass sheets that have their peripheral and marginal edge portions strengthened in the practice of the invention. For example, but not limiting to the invention, the flat glass sheets can have a solar control coating and/or electrically heatable coating having bus bars and electrically conductive leads to provide external excess to the coating. Nonlimiting embodiments of solar control and electrically conductive coatings that can be used in the practice of the invention include but are not limited to the coatings discussed in European Patent Application No. 00939609.4, which document is hereby incorporated by reference. Bus bars and conductive leads can include but are not limited to the type discussed in U.S. patent application Ser. Nos. 10/201,863 and 10/201,864 which applications are hereby incorporated by reference.

Further, in accordance to usual practice, but not limiting to the invention, one of the glass sheets can have a black ceramic paste screen printed on the marginal edges of the sheet to prevent solar degradation of the underlying adhesive securing the windshield to the automotive body. Still further, in the practice of the invention, the glass sheets may be clear glass sheets, colored glass sheets or mixtures thereof when more than one glass sheet is on the bending iron.

Still further, as the flat-glass-laden irons 44 move through the heating section 50 of the lehr 48 (FIG. 2) or through the compartments 75-79 of the furnace 70 (FIG. 4), mechanical and/or air-pressured assistance, e.g. but not limited to the types discussed in U.S. Pat. Nos. 4,894,080 and 5,049,178 (not shown in the Figs. of the drawing) can be used to apply a biasing force to assist in shaping the sheets while supported on the bending iron. U.S. Pat. Nos. 4,894,080 and 5,049,178 are hereby incorporated by reference.

Laminating Cycle

After the shaped sheets having the strengthened edges are cooled, a plastic interlayer sheet of the type used in the art of laminating glass sheets, e.g. PVB, polyvinyl chloride ("PVC") or polyurethane is placed between the shaped sheets to provide a subassembly. In the manufacture of heatable laminates, e.g. heatable automotive windshields, one of the shaped sheets has an electrically conductive coating, and the plastic sheet can be an interlayer composite having bus bars, e.g. but not limited to the type discussed in U.S. patent application Ser. No. 10/201,863 which application is hereby incorporated by reference. A vacuum ring of the type used in the manufacture of laminated windshields is positioned over the periphery of the subassembly (the glass sheets having the interlayer sheet therebetween) and a vacuum of 20-28 inches of mercury is pulled. The windshield subassembly having the vacuum applied is place in an oven set at 260° F. (126.7° C.) for 15 minutes to heat the subassembly to a temperature of about 225° F. (127.2° C.). While the windshield subassembly is in the oven, the vacuum is continuously pulled through the channel to pull air from between the sheets. The heat and vacuum seals the marginal edges of the windshield subassembly. Thereafter the edge sealed windshield subassembly is placed in an air autoclave and laminated. When PVB is used for the interlayer sheet, autoclaving will normally take place at a temperature in the range of 135° C. to 150° C., and a pressure of 8 to 15 bars for a period of 15 to 45 minutes. Alternative interlayer materials may be autoclaved in a higher range up to 160° C. or 170° C.

A pair of shaped glass sheets having strengthened edges separated by a PVB sheet was laminated in a manner similar to the manner discussed above.

As can be appreciated by those skilled in the art of laminating, the edge sealing of the subassembly and laminating of the edge sealed subassembly is not limiting to the invention. For example, the subassembly can be sealed using nipper rollers or bagging the subassembly, and the edge sealed subassembly can be laminated in an oil autoclave.

The discussion will now be directed to nonlimiting embodiments of the invention to strength the edges of the glass sheets while supported on the outline mold or bending iron.

As discussed above, after the glass sheets are shaped, heat is extracted from at least peripheral edge portions of the glass sheets to strengthen the peripheral and marginal edge portions of the glass sheets by cooling the edge portions, e.g. the peripheral and marginal edge portions of the glass sheets at a faster rate than the central portion of the sheets. In the practice of the invention, soda-lime-silicate-glass sheets were heated to a temperature in the temperature range of 950 to 1300° F. (510 to 704° C.) to heat soften and shape the sheets as discussed above. Although not limiting to the invention, heat was extracted from the edge portions of shaped sheets after they were shaped and the shaped sheets were at a temperature in the temperature range of 950 to 1150° F. (510 to 521° C.). In the practice of the invention, it is preferred to cool the edges of the glass sheets between the deformation temperature and the annealing temperature point of the glass, and more preferably, slightly above the annealing temperature point. In this manner, the shape of the sheet has minimal if any change in its contour. A sheet that has no or minimal change in its shape is considered to be "dimensionally stable."

Figure 2:
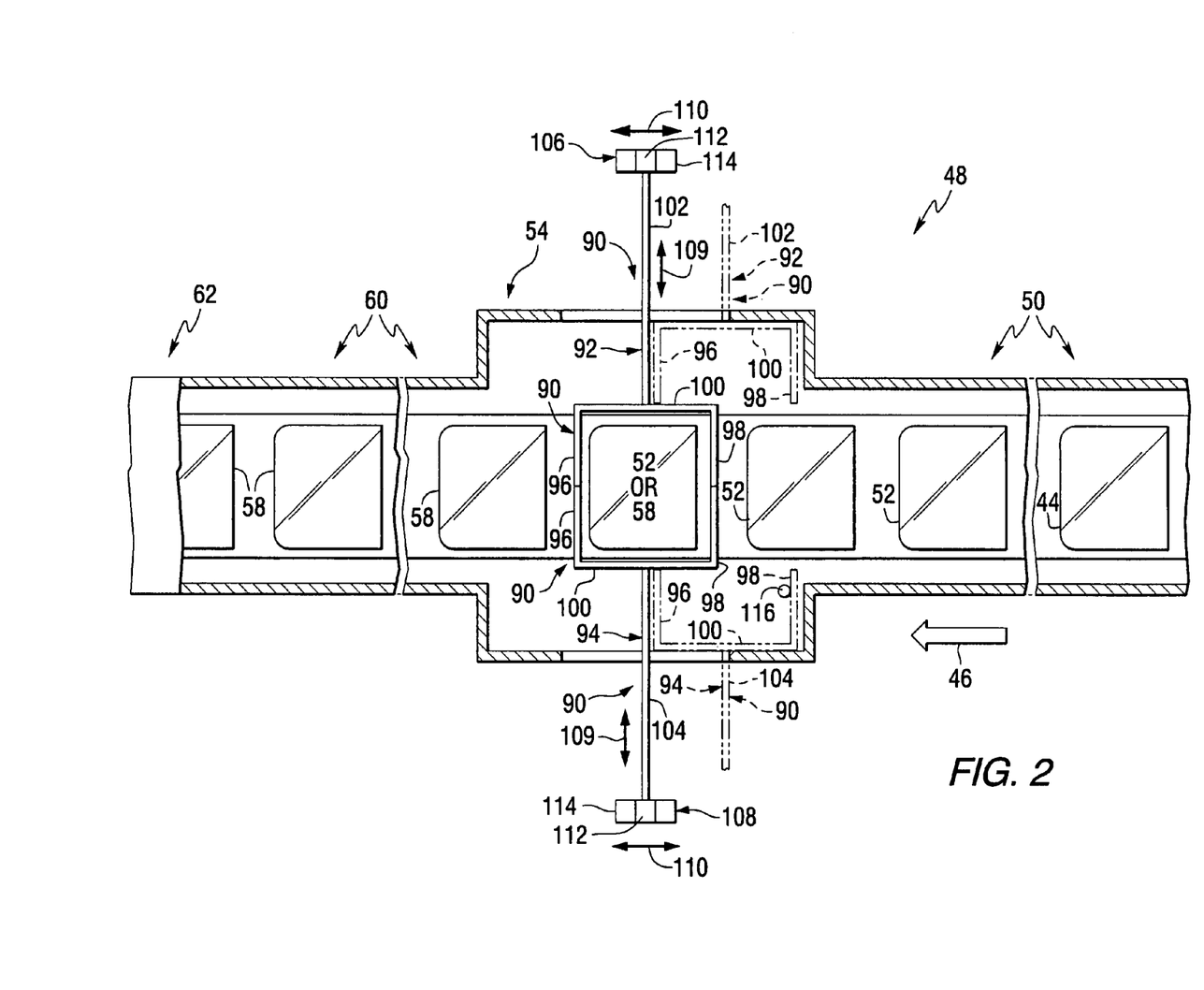
FIG. 2 is a plan view of the interior of a nonlimiting embodiment of a lehr that can be used in the practice of the invention to shape a pair of glass sheets, edge strengthen the edge portions of the sheets in accordance with the invention and anneal the edge strengthened shaped sheets.

Nonlimiting embodiments of the invention will be discussed using the lehr 48 shown in FIG. 2. With reference to FIG. 2, there is shown heat extracting member 90 incorporating features of the invention. The member 90 includes a first section 92 and a second section 94. The sections 92 and 94 are similar in construction and each includes a pair of elongated heat extracting arm members 96 and 98 connected by elongated heat extracting intermediate arm member 100. Although not limiting to the invention, the free ends of the arm members 96 and 98 are closed. The heat extracting arm members 96, 98 and 100 are discussed in detail below. An elongated rod 102 has one end connected to the intermediate heat-extracting arm member 100 of the section 92, and an elongated rod 104 has one end connected to the intermediate arm member 100 of the section 94, of the heat-extracting member 90. The other end of each of the rods 102 and 104 is connected to a moveable push-pull arrangement 106 and 108, respectively. The components of the moveable push-pull arrangements 106 and 108 are not limiting to the invention and each function (a) to move the sections 92 and 94 along a reciprocating path 109 toward one another to position the arm members 96, 98 and 100 as shown in solid lines in FIG. 2 about a shape sheet-laden iron 52 (see also FIG. 3) and to move the sections 92 and 94 away from one another, and (b) to move the sections 92 and 94 along a reciprocating path 110 to move the heat extracting member 90 in coordinated movement with the shaped sheet-laden iron 52 as it moves through the edge cooling section 54 of the lehr 48, and to position the sections 92 and 94 of the heat extracting member 90 in a sheet receiving position as shown in phantom in FIG. 2, after the edge portions of the shaped sheets have been edge strengthened.

The components of each of the moveable push-pull arrangements 106 and 108, although not limiting to the invention can include a push-pull component 112, e.g. but not limiting the invention thereto, a piston, a rack and pinion arrangement or a chain drive, to move the sections 92 and 94 toward and away from one another, and a moveable platform 114, e.g. but not limiting to the invention a motor driven platform or a platform mounted on electrically powered rails (not shown) of the type used in the art, through which signals are forwarded to control speed and direction of the platform, to move the sections 92 and 94 of the heat extracting member 90 along the reciprocating path 110.

With reference to FIGS. 2 and 3 as needed, in a nonlimiting embodiment of the invention, as the shaped sheet-laden iron 52 moves into the edge cooling section 54, the first section 92 and the second section 94 of the heat extracting member 90 are in the sheet receiving position as shown in phantom at the entrance end of the edge cooling section 54 of the lehr 48. When a shaped sheet-laden iron 52 moving into the edge cooling section 54 is aligned with the intermediate arm member 100 of the sections 92 and 94, a sensor 116 activates the push-pull component 112 of the moveable push-pull arrangements 106 and 108 to move the rods 102 and 104 toward one another to position the arm members 96, 98 and 100 of the sections 92 and 94 around the perimeter of shaped glass sheets on the bending iron 10. In FIG. 3, only the intermediate arm member 100 of the sections 92 and 94 of the heat-extracting member 90 is shown positioned adjacent the peripheral edge portions 56 of the glass sheets 38 and 40. As the heat extracting member 90 is positioned around the perimeter of the shaped sheet, the sensor 116 or timer (not shown) activates the moveable platform 114 of the moveable push-pull arrangements 106 and 108 to move through heat extracting member 90 along the path 110 toward the exit end of the edge cooling section 54 of the lehr 48, e.g. to the left as viewed in FIG. 2. As the shaped sheet-laden iron 52 moves through the edge cooling section 54, the heat extracting member 90 extracts heat from the peripheral and marginal edges of the glass sheets in a manner discussed below to strengthen the peripheral edges of the shaped sheets. After edge portions of the glass sheets are heat strengthened, portions of the rods 92 and 94 are moved out of the edge cooling section 54 by the push-pull component 112 of the moveable push-pull arrangements 106 and 108 to move the sections 92 and 94 away from one another. The edge strengthened sheet-laden mold 58 continues to move through the edge cooling section 54 into the annealing section 60 of the lehr 48 as the sections 92 and 94 are moved upstream by the moveable platforms 114 of the moveable push-pull arrangements 106 and 108 into their initial position to await the next shaped sheet-laden mold 52.

As can be appreciated, the invention is not limited to having one heat extracting member 90 incorporating features of the invention in the edge cooling section 54 of the lehr 48. For example, but not limiting to the invention, two or more heat extracting members can be provided to have one heat extracting member cooling the edges of the glass sheets, a second heat extracting member in the initial position, and a third heat extracting member moving toward the initial position, and/or any other combinations thereof.

Figure 5:
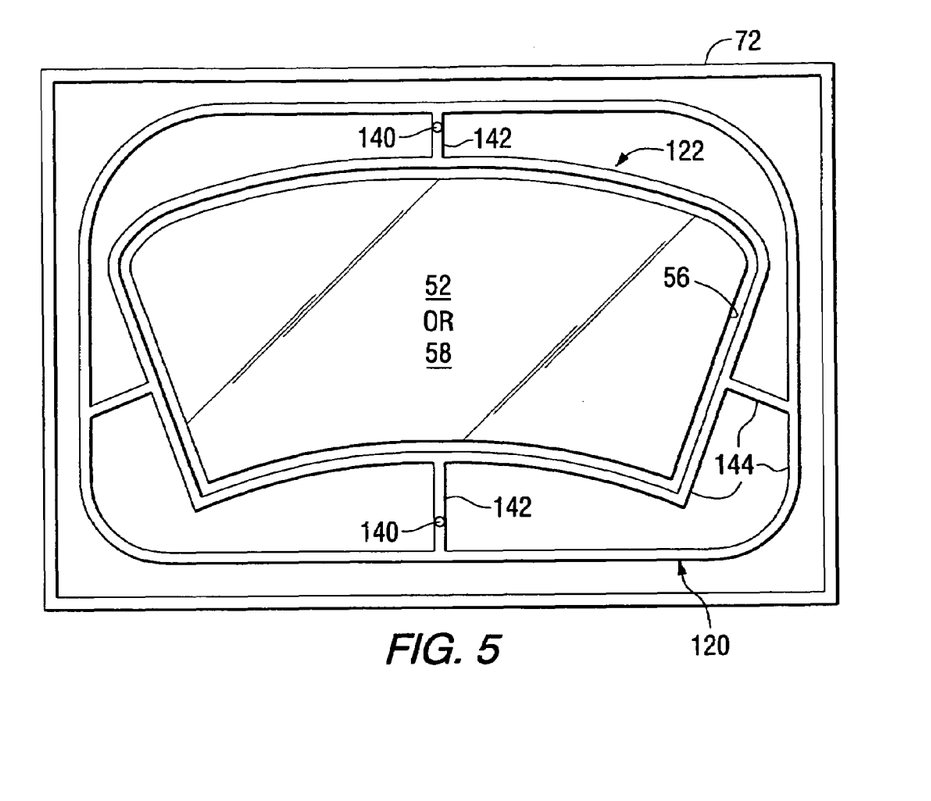
FIG. 5 is a plane view of a heat extracting member incorporating features of the invention positioned about the peripheral edges of glass sheets to strengthen the edges of the glass sheets in accordance to the teachings of the invention.

With reference to FIGS. 4 and 5 as needed, in another nonlimiting embodiment of the invention, after the open top box 72 having the shaped sheet-laden iron 52 moves into the zone 79 (see FIG. 4), edge cooling device 120 incorporating features of the invention shown in FIG. 5 is moved into the box 72 in any convenient manner to position heat extracting member 122 around the perimeter or edges 56 of the shaped sheets 38 and 40, for the heat extracting member 90. The edges of the shaped glass sheets are cooled in a manner to be discussed below to cool the perimeter of the sheets at a faster rate than the center portions of the sheets to strengthen the edge portions of the sheets. After the edges of the sheets are cooled for a predetermined time, the edge-cooling device 120 is moved out of the box 72. The box 72 having the edge strengthened shaped sheet-laden iron 58 is moved from the compartment 79 to the compartment 80 as the next box 72 having the shaped sheet-laden iron 52 moves from the compartment 78 to the compartment 79.

As can be appreciated, the edge-cooling device 120 can be lowered into the box 72 to position the heat extracting member 122 around the edges of the shaped sheets and lifted out of the box 72 in any convenient manner, e.g. but not limiting to the invention using the elevator mechanism discussed in U.S. Pat. Nos. 4,894,080 and 5,049,178 for raising and lowering the mechanical and/or air-pressured bending mechanism discussed in the patents.

In the following discussion several nonlimiting embodiments of the invention to extract or remove heat from the peripheral edge portions of the sheets are discussed; however, as will be appreciated, the invention is not limited thereto. Extracting heat from the peripheral edge portions of the sheets to cool the peripheral and marginal edge portions of the sheets faster than the central portions of the sheets can be accomplished by moving a liquid toward peripheral edge portions of the glass sheets, e.g. moving gas through the arm members 96, 98 and 100 of the sections 92 and 94 (FIG. 2), and heat extracting member 122 (FIG. 5); by applying a vacuum, e.g. pulling a vacuum through the arm members 96, 98 and 100 of the sections 92 and 94 to pull the heated air in the edge cooling section 54 of the lehr 48, and pulling vacuum through the heat extracting member 122 to pull the heated air in the compartment 79 of the furnace 70, over the peripheral and marginal edges of the shaped sheets to cool and edge strengthen the peripheral and marginal edge portions of the glass sheets, and/or by positioning a heat absorbing body, e.g. providing radiant absorbing arm members 96, 98 and 100, and radiant absorbing heat extracting member 122 adjacent the peripheral edge portions 56 of the sheets 38 and 40 to absorb radiant heat from the peripheral and marginal edge portions of the glass sheets.

Figure 6:
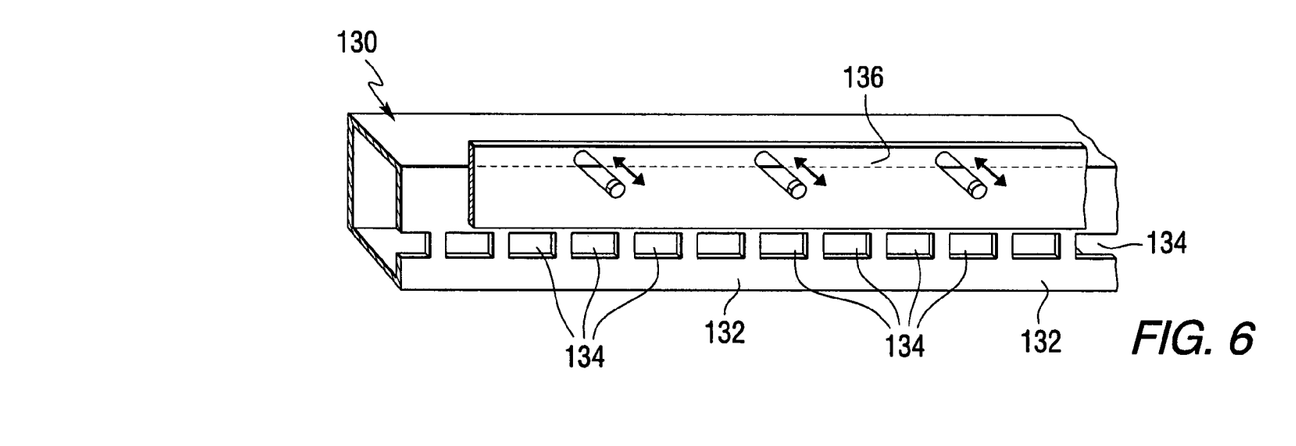
FIG. 6 is a fragmented side elevated view of a nonlimiting embodiment of a member for extracting heat from the edges of glass sheets in accordance to the teachings of the invention.

In the following discussion the arm members 96, 98 and 100, and the heat extracting member 122 are manifolds to move a cooling liquid, e.g. air, or pull a vacuum there through to cool and strengthen the edges of the glass sheets. With reference to FIG. 6, a segment 130 for controlling the flow of air toward the peripheral edges of the sheets, or for pulling a vacuum adjacent the peripheral edges of the sheets is shown. The segment 130 is not limiting to the invention and can be a segment of the heat extracting arm members 96, 98 and 100 of the heat extracting member 90 (see FIG. 2) and/or a segment of the heat extracting member 122 (see FIG. 5.). Surface 132 of the member 130 faces the edges 56 of the glass sheets 38 and 40 and has a plurality of spaced holes 134 and a slidably mounted plate 136. With the plate 136 moved and positioned to the left as shown in FIG. 6, e.g. open position, the holes or passageway openings 134 are exposed, and with the plate 136 moved to the right, e.g. closed position (not shown) the holes or passageway openings 134 are covered. The plate 136 can be in the closed position as the sections 92 and 94 (FIG. 2) move from the initial position to the engaging position, and as the heat extracting member 120 moves into the box 72 (FIG. 5), to prevent premature cooling of the edges of the glass sheets. When members 92 and 94 or member 120 is in its cooling position, plate 136 to its open position so that edges 56 can be cooled. After the edges of the sheets are cooled and strengthened, the plate 136 can be moved back over the holes 134 to prevent cooling of the environment as the sections 92 and 94 are moved toward initial positions in the edge cooling section 54 of the lehr 48, or the heating extracting member 120 is lifted out of the box 72. As can be appreciated, the plate 136 can be eliminated. In this instance, the gas or vacuum is turned off as the sections 92 and 94, or the heat extracting member 120 moves into position, and the gas or vacuum is turned on when the sections, or heat extracting member are in position.

Although not limiting to the invention, but to provide an appreciation of the interaction of certain parameters the following discussion is presented. The amount and rate of heat extracted from the edges of the sheets for purposes of this discussion are a function of the difference between the temperature of the heat extracting medium, e.g. a liquid such as but not limited to gas, a vacuum or a radiant absorbing body, and the edges of the glass sheets; the temperature difference between the edges of the glass sheet and the interior of the glass sheet, and the thickness of the glass sheet. In the following discussion, although not limiting to the invention, the glass sheets have a thickness of 1.6 to 5 millimeters. As the temperature of the heat extracting medium decreases and the temperature difference between the heat extracting medium and the edges of the glass sheets increase while the temperature difference between the edges of the glass sheets and the interior of the glass sheets, and the temperature of the interior of the edge cooling section remain constant, the amount and rate of heat extracted from the edges of the glass sheets increases and vice versa. As the temperature of the glass edges decreases and the temperature difference between the edges of the glass sheet and the interior of the glass sheets increases while the temperature difference between the heat extracting medium and the edges of the glass sheets remain constant, the amount and rate of heat extracted from the edges decreases and vice versa. As the amount and rate of heat extracted from the edges of the glass sheets increases, the edge strength increases and vice versa. The temperature of the interior of the edge cooling section 54 of the lehr 48 and the temperature of the compartment of the furnace 70 where the invention is practiced to edge strengthened the shaped glass sheets has an effect on the rate of cooling. In the above discussion the temperature of the edge cooling section 54 and the compartment of the furnace 70 where the invention is practiced is taken into account by considering the heat of the glass sheets.

As can be appreciated, the temperature difference between the edges of the glass sheets and the interior of the glass sheets should not exceed the temperature at which the stress in the edges of the glass sheets result in fracturing the edges of the glass sheets. For soda-lime-silicate glass the temperature differential should not exceed 250° F. (121° C.), for example not more than 200° F. (33° C.).

The amount and rate of heat extracted by the medium, e.g. gas, vacuum or radiant heat absorbing body, for purposes of this discussion depends on the following parameters. For gas, the parameters to be considered are the temperature of the gas, the area of gas flow openings, e.g. holes 134 shown in FIG. 6, and the distance between the openings, e.g. the surface 132, and the edges 56 of the sheets 38 and 40 (see FIG. 3), the gas flow, the gas pressure and heat absorbing property of the gas. As the temperature of the gas increases while the remaining parameters remain constant, the rate and amount of heat extracted decreases and vice versa; as the area of gas flow openings increase while the remaining parameters remain constant, the amount of heat extracted can be expected to decrease and vice versa; as the distance between the openings and sheet edges increase while the remaining parameters remain constant, the amount and rate of heat extracted can be expected to decrease and vice versa; as the gas flow increases while the remaining parameters remain constant, the amount and rate of heat removal increases and vice versa; and as the heat absorbance of the gas increases, while the remaining parameters are kept constant, the rate of heat removal and depth of temper increases and vice versa.

The invention is not limited to the system used to move a liquid, e.g. gas into the arm members 96, 98 and 100 of the sections 92 and 94 of the heat-extracting member 90 shown in FIG. 2 or the heat extracting member 122 of the heat extracting device 120 shown in FIG. 5. For example, but not limiting to the invention, the gas can be moved through the rods 102 and 104, through the intermediate arm members 100 and thereafter through the arm members 96 and 98 of the sections 92 and 94 shown in FIG. 2, and through openings 140 in hollow support rods 142 to the heat extraction member 122 shown in FIG. 5. To prevent chilling of the edge portions of the glass sheets too quickly, the gas is preferably at a temperature in the temperature range of 700 to 800° F.

In one nonlimiting embodiment of the invention, gas is used to extract heat from the edge portions of the glass sheets. As can be appreciated, the invention is not limited to the type of gas used; however because the gas is used in a heated environment, gas or gas mixtures that would combustion in such an environment are not recommended and should not be used. Gases that can be used in the practice of the invention, but not limited thereto include air, carbon dioxide, nitrogen, argon and other inert gas and mixtures.

In the practice of the invention, it is preferred to extract sufficient heat to provide edge compression of at least 3000 psi, e.g. 3,000-5,000 psi (20.7-34.5×10$^6$ Pa). The invention contemplates the edge strengthening or tempering the peripheral edge of the glass sheet. As can be appreciated, the invention is not limited thereto and can extend from the peripheral edge of the sheet, e.g. but not limiting to the invention in the marginal edge portions of the sheet within a distance of about 0.125 inch (0.32 centimeter) from the surface of the peripheral edge of the glass sheets. In the practice of the invention, a gas manifold was placed around a pair of shaped glass sheets each having a thickness of 2.1 millimeters supported on a bending iron. The manifold was spaced 0.5 inches from the edge. The manifold had holes 134 having an open area of 0.0122 square inches and on a spacing of 0.25 inches. Air heated to a temperature of 600° F. (316° C.) was moved through the holes at a rate of 12 standard cubic feet per minute per foot of treated edge. The edges of the glass sheets were cooled for a period of 30 seconds and had edge strength of 4000 psi.

Consider now the use of vacuum to extract heat from the edges of the glass sheets. The parameters to consider when vacuum is used are the amount of vacuum pulled, the area of the openings, e.g. the holes 134 shown in FIG. 6, the distance between the openings, e.g. the surface 132, and the edges 56 of the sheets 38 and 40 (see FIG. 3), the distance between the adjacent vacuum holes, and the temperature of the edge cooling section 54 of the lehr 48 (see FIG. 2) or compartment of the furnace 70 where the edges of the glass sheet are cooled (see FIG. 4). As the amount of vacuum pulled increases while the remaining parameters remain constant, the amount of heat absorbed increases and vice versa; as the area of the openings increase and the remaining parameters remain constant, the amount of heat extracted increases and vice versa; as the distance between the openings increases while the remaining parameters remain constant, the amount of heat extracted decreases and vice versa, and as the distance between the openings through which the vacuum is pulled and the edges of the glass sheets increases while the remaining parameters remain constant, the amount of heat extracted decreases and vice versa. As the temperature of the edge cooling section 54 of the furnace 48 and of the compartment of the furnace 70 where the edges of the glass sheet are cooled increases while the remaining parameters remain constant, the amount of heat extracted from the sheet decreases and vice versa.

The invention is not limited to the system used to pull the vacuum through the arm members 96, 98 and 100 of the sections 92 and 94 of the heat-extracting member 90 shown in FIG. 2 or the heat-extracting member 122 of the heat-extracting device 120 shown in FIG. 5. For example, but not limiting to the invention, a vacuum can be pulled through the rods 102 and 104, through the intermediate arm members 100, and thereafter, through the arm members 96 and 98 of the sections 92 and 94 shown in FIG. 2, and through openings 140 in hollow support rods 142 of the heat extraction member 122 shown in FIG. 5.

A still further nonlimiting technique of the invention to extract heat from the edges to strengthen the edges of the glass sheets is to use a radiant heat-absorbing member (hereinafter "RHA member"). The parameters to be considered are the heat absorbing coefficient of the RHA member, the emissivity of the RHA member, the distance between the RHA member and the edges of the glass sheets, the heat in the edge cooing section 54 of the lehr 48 (see FIG. 2) or the compartment of the furnace 70 where the edges of the glass sheets are cooled (see FIG. 4), and the rate of heat extraction from the RHA member, e.g. water cooling pipes contacting the surfaces of the RHA member other than the surface absorbing heat from the edges of the glass sheets. As the heat absorbing coefficient of the RHA member increases while all the other parameters are kept constant, the heat absorbed from the edges of the glass increases and vice versa; as the emissivity of the RHA member increases while the remaining parameters remain constant the heat absorbed from the glass edges increases and vice versa; as the distance between the RHA member and the edges of the glass sheet increases while the remaining parameters remain constant, the amount of heat adsorbed decreases and vice versa; as the heat in the surrounding area, e.g. the edge cooling section 54 of the lehr 50 or the compartment of the furnace 70 where the edges of the glass sheets are cooled increases while the remaining parameters are kept constant, the rate of heat absorbed from the edges of the sheet decreases and vice versa, and as the heat extracted from the RHA member by the cooling medium increases while the remaining parameters remain constant, the heat removed from the edges of the sheets increases, and vice versa.

The invention is not limited to system used to extract heat using a RHA member. For example, but not limiting to the invention, pipes through which cooling water is circulated, e.g. the arm members 96, 98 and 100, and the heat extracting member 122 would function as cooling pipes and would not have the passageways 134 shown in FIG. 6. Discreet RHA members or a continuous strip of a RHA member, e.g. a black body such as a carbon body, are (is) mounted on the surface of the arm members, and surface of the heat extracting member facing the edges of the glass sheets. A cooling medium, e.g. water, moves through one chamber of a dual chamber in the rods 102 and 104, the intermediate arm members 100 and thereafter through the arm members 96 and 98 of the sections 92 and 94 shown in FIG. 2, and the return water moves through the other chamber of the dual chamber through the arm members 96 and 96, the intermediate arm member 100 and the rods 102 and 104. For the heat-extracting member 122 shown in FIG. 5, the cooling medium is moved through opening 142 in one of the support rods 140 through the heat-extracting member 122 and out of the opening 140 of the other support rod 140.

As can be appreciated, the invention is not limited to the manner in which the heat extracting members are positioned around the edges often sheets, e.g. but not limiting the invention thereto, the arm members 96, 98, 100 (see FIG. 2) can be separately mounted and separately move toward or away from their respective edges to cool the edge portions of the sheets as discussed, or the arm members 96, 98 and 100 can be connected to a common support e.g. support ring (not shown) which may be raised or lowered to move the arm members 96, 98 and 100 toward and away from the edges of the sheets, or the sheets lowered or raised, to position the edges of the sheets in facing relationship to the arm members 96, 98 and 100 or the heat extracting member 122.

As can be appreciated, the invention is not limited to the manner in which the gas, vacuum or water is supplied. For example, but not limiting to the invention, the gas, vacuum or water can be supplied by plant piping or storage units (now shown).

Nonlimiting embodiments of the invention contemplate strengthening the full periphery of the sheets (see FIGS. 2 and 5) or selected zones of the periphery of the glass sheets (see FIG. 7) (hereinafter also referred to as "zone heating" or "zone edge strengthening"). As shown in FIG. 2, the arm members 96, 98 and 100 of the first and second sections 92, 94 of the heat extracting member 90, and as shown in FIG. 5 the heat extracting member 122 surrounds the full periphery or edge portions 56, to extract heat from the full periphery or edge portions 56, to edge strengthen the full periphery or edge portions 56, of the sheets 38 and 40.

Figure 7:
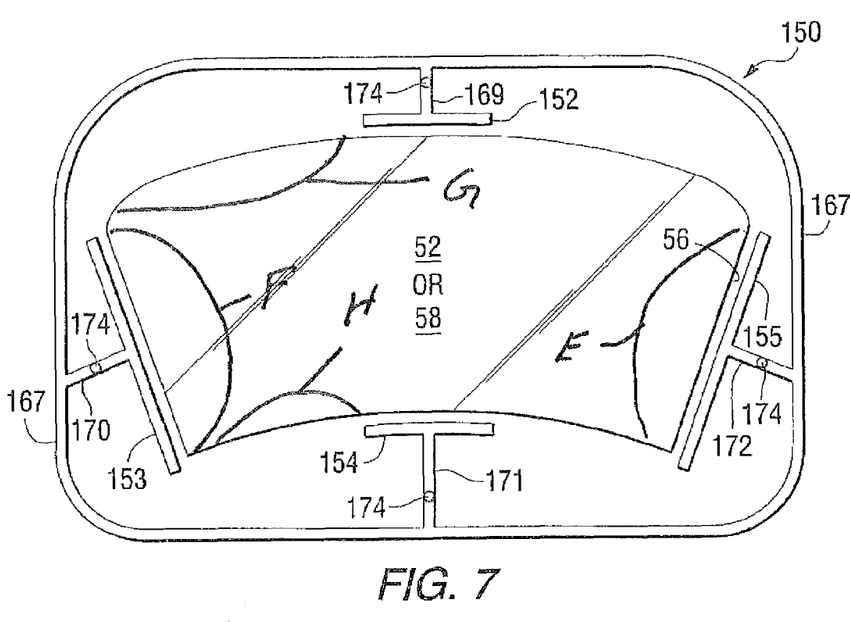
FIG. 7 is a view similar to the view of FIG. 5 of a nonlimiting embodiment of the invention for zone strengthening edge portions of glass sheets.

With reference to FIG. 7, there is shown a nonlimiting embodiment of the invention to strengthen edge zones of the periphery. More particularly, as shown in FIG. 7, heat extracting member 150 includes heat extracting members 152-155 mounted on a frame 167 by hollow support rods 169-172, respectively to position the heat absorbing members 152-155 in facing relationship to selected peripheral edge portions, e.g. but not limiting to the invention, the center portion of the long sides of the sheets and the sides of the sheets as shown in FIG. 7. The selected edge portions are cooled using the RHA member, and/or moving a cooling medium through, or pulling a vacuum through members 152-155 as discussed earlier, e.g. through holes 174 in the support rods 169-172.

Zone edge strengthening can be used when a process or design applies more stress to selected edge portions of the glass sheet(s) than to other edge portions. The invention contemplates zone cooling any portion of the edges of the sheets, e.g. but not limiting to the invention, cooling two edges, e.g. opposite edges of the glass sheets, cooling only the middle portions of the edges of the glass sheets. As can be appreciated, in those instances where fractures are observed only in a given portion of the edge, e.g. as a result of design or equipment handling the glass sheets, the edges can be strengthen by cooling only that edge portion.

A nonlimiting technique to zone cool the edges of the glass sheets is to absorb heat along a gradient similar to the gradient of edge strength desired. For example but not limiting to the invention, positioning the heat absorbing member around the full periphery of the sheet and move gas or pull vacuum through holes having various size openings, or having holes of uniform size and cooling the edges as the heat extracting sections 92 and 94 (FIG. 2) are moved from the initial position to the work position; the gas or vacuum is discontinued when the sections 92 and 94 encircle the periphery of the sheets. The edge portions first cooled are cooled for a longer period of time than the edge portions last cooled and will have greater edge strength. Another technique for zone cooling is to have holes, e.g. the holes 134 of FIG. 6 with different sized opening. The larger the opening the more air flow moving out or vacuum pulled and the more cooling of the edge. As can be appreciated other techniques can be used to cool the glass at different rates or at different positions for zone cooling or gradient cooling using gas, vacuum or a RHA member.

As can be appreciated, the particular embodiments described in detail herein are illustrative only and are not limiting to the scope of the invention, which is to be given the full breadth of the appended claims and any and all equivalents thereof.

What is claimed is:

1. A glass sheet comprising:
   a first major surface, an opposite second major surface, a peripheral edge circumscribing the sheet and joining the first and the second major surfaces, and
   a first length of the peripheral edge less than perimeter of the peripheral edge; a second length of the peripheral edge less than the perimeter of the peripheral edge, and a third length of the peripheral edge less than the perimeter of the peripheral edge, wherein the third length is between the first and the second lengths, and the first length has an edge compression greater than the edge compression of the third length, and the second length has an edge compression greater than the edge compression of the third length.

2. The glass sheet according to claim 1 wherein the first length has an edge compression of at least 3,000 psi (20.7× $10^6$ Pa) (211 kilograms per square centimeters), and the third length has an edge compression of less than 3,000 psi (20.7× $10^6$ Pa) (211 kilograms per square centimeters).

3. The glass sheet according to claim 2 wherein the edge compression of the first and the second lengths are each in the range of 3,000-5,000 pounds per square inch (20.7-34.5× $10^6$ Pa) (211-352 kilograms per square centimeter) terminating a distance of 0.125 inch (0.32 cm) from the peripheral edge.

4. The glass sheet according to claim 1 further comprising a fourth length of the peripheral edge less than the perimeter of the peripheral edge, the fourth length between the first and the second lengths, and opposite to the third length, wherein the first length has an edge compression greater than the edge compression of the fourth length, and the second length has an edge compression greater than the edge compression of the fourth length.

5. The glass sheet according to claim 4 wherein the second length is opposite to the first length, and the fourth length is opposite to the third length, wherein the first and the second lengths have an edge compression of at least 3,000 psi (20.7× $10^6$ Pa) (211 kilograms per square centimeters), and the third and the fourth lengths have an edge compression of less than 3,000 psi (20.7× $10^6$ Pa)) (211 kilograms per square centimeters).

6. The glass sheet according to claim 1, wherein the glass sheet is part of a transparency selected from transparencies for above water, below water, air and/or space vehicles; automotive side windows, automotive back windows, multiple glazed windows for homes, buildings and temperature controlled storage compartments having a viewing area.

7. The glass sheet according to claim 1, wherein the glass sheet is a shaped glass sheet.

8. The glass sheet according to claim 7, wherein the shaped glass sheet is a first shaped glass sheet of a laminate and the laminate further comprises a second shaped glass sheet adhered to the first shaped glass sheet by a plastic interlayer sheet.

9. The glass sheet according to claim 8, wherein the laminate is an automotive windshield.

10. The glass sheet according to claim 9, wherein an inner surface of at least one of the sheets of the laminate has an electroconductive coating.

11. The glass sheet according to claim 9, wherein an inner surface of one of the sheets of the laminate has a solar control coating.

12. The glass sheet according to claim 1, wherein the glass sheet is a first glass sheet of a laminate and the laminate further comprises a second glass sheet adhered to the first glass sheet by a plastic interlayer sheet, wherein the second sheet comprises:
- a first major surface, an opposite second major surface, a peripheral edge circumscribing the second sheet and joining the first and the second major surfaces of the second sheet, and
- a first length of the peripheral edge less than perimeter of the peripheral edge; a second length of the peripheral edge less than the perimeter of the peripheral edge, and a third length of the peripheral edge less than the perimeter of the peripheral edge, wherein the third length is between the first and the second lengths, and the first length has an edge compression greater than the edge compression of the third length, and the second length has an edge compression greater than the edge compression of the third length.

13. The glass sheet according to claim 12, wherein the first and second glass sheets of the laminate are shaped glass sheets.

14. The glass sheet according to claim 13, wherein the laminate is an automotive windshield.

15. The glass sheet according to claim 12, wherein the second sheet further comprising a fourth length of the peripheral edge less than the perimeter of the peripheral edge of the second sheet, the fourth length between the first and the second lengths of the second sheet, and opposite to the third length of the second sheet, wherein the first length of the second sheet has an edge compression greater than the edge compression of the fourth length of the second sheet, and the second length of the second sheet has an edge compression greater than the edge compression of the fourth length of the second sheet.

16. The glass sheet according to claim 15 wherein the first length of the first and the second sheets are aligned with one another; the second length of the first and the second sheets are aligned with one another; the third length of the first and the second sheets are aligned with one another, and the fourth length of the first and the second sheets are aligned with one another.

17. The glass sheet according to claim 16, wherein the first and second lengths of the first and second sheets each have an edge compression of at least 3,000 psi ($20.7 \times 10^6$ Pa), and the second, fourth, sixth and eighth areas each have a strength of less than 3,000 psi ($20.7 \times 10^6$ Pa) (211 kilograms per square centimeters).

18. The glass sheet according to claim 16 wherein the edge compression of the first and the second lengths of the first and second sheets are each in the range of 3,000-5,000 pounds per square inch ($20.7$-$34.5 \times 10^6$ Pa) (211-352 kilograms per square centimeter) terminating a distance of 0.125 inch (0.32 cm) from the peripheral edge.

19. A glass sheet comprising:
- a first major surface, an opposite second major surface, a peripheral edge circumscribing the sheet and joining the first and the second major surfaces;
- an edge compression in the range of 3,000-5,000 pounds per square inch ($20.7$-$34.5 \times 10^6$ Pa) (211-352 kilograms per square centimeter), the edge compression starting at the peripheral edge of the sheet and terminating a distance of 0.125 inch (0.32 cm) from the peripheral edge, and
- an annealed center portion having a boundary line within the peripheral edge and spaced from the peripheral edge a distance of 0.125 inch (0.32 cm).

* * * * *